United States Patent [19]
John

[11] Patent Number: 5,390,611
[45] Date of Patent: Feb. 21, 1995

[54] THERMAL PROCESSING OF FLY ASH

[76] Inventor: Richard E. John, 8939 Neil St., Denver, Colo. 80221

[21] Appl. No.: 16,203

[22] Filed: Feb. 24, 1993

[51] Int. Cl.$^6$ .................................................. F23J 1/00
[52] U.S. Cl. ........................... 110/165 A; 106/DIG. 1; 110/188; 110/190; 110/250
[58] Field of Search .................... 106/405, DIG. 1; 110/165 A, 185, 188, 190, 250

[56] References Cited

U.S. PATENT DOCUMENTS

| | | | |
|---|---|---|---|
| 3,328,180 | 6/1967 | Ban | 106/DIG. 1 |
| 4,549,053 | 10/1985 | Haugh . | |
| 4,705,409 | 11/1987 | Trerice | 106/DIG. 1 |
| 5,090,338 | 2/1992 | Harada et al. | 110/165 A |

FOREIGN PATENT DOCUMENTS 0498008  3/1992  Japan .............................. 110/165 A

OTHER PUBLICATIONS

Article Entitled "Thermal Processor Burns Off Carbon to Reduce Fly Ash Variability" Aberdeens Concrete Trader, Aug. 1991, pp. 1 & 3.
Article Entitled "Thermal Processor Burns Off Carbon to Reduce Fly Ash Variability", Aberdeen's Concrete Construction, Feb. 1992, vol. 37, No. 2, pp. 114–118.

*Primary Examiner*—Edward G. Favors
*Attorney, Agent, or Firm*—Homer L. Knearl

[57] ABSTRACT

Fly ash is thermally processed in electrically heated, closed pre-heat and combustion chambers. In the combustion chamber, the fly ash is tumble mixed to produce maximum combustion of carbon in the fly ash. Further, the tumble mixing is done while injecting air and oxygen into the tumbling heated fly ash. The tumble mixing is accomplished by feed screws. The screw shafts are hollow with air orifices at regular intervals. As a result, an oxygenated air mixture may be injected into the tumbling fly ash to aid the combustion of the carbon in the fly ash. The flow rates for air and oxygen, the temperature of the pre-heat chamber and the combustion chamber, and the ash flow rate (speed of feed screws) may be adjusted to obtain the proper combustion to get the desired Loss On Ignition (LOI) value for the fly ash. Spectrometers monitoring the color of the output of the fly ash may be calibrated to adjust one or more of the above variables.

11 Claims, 4 Drawing Sheets

THERMAL PROCESSING OF FLY ASH

BACKGROUND OF THE INVENTION

1. Field of the Invention

This invention is directed to a method and apparatus for processing fly ash from coal burning facilities. More particularly, the invention relates to thermally processing variable carbon content fly ash so that it becomes fly ash with a substantially constant carbon content useable as an additive for concrete.

2. Description of Prior Art

It has been known for some time that fly ash with a sufficiently low carbon content was extremely useful as an additive to concrete. The fly ash significantly strengthens the concrete, and extends the useful life of the concrete. However, the carbon content of the fly ash affects the air content and the water demand of the concrete mixture. High carbon content ash requires more air entraining agent to be used in the concrete mixture, and also requires more water for the concrete mixture.

Most concrete specifications require the Loss On Ignition (LOI) value for fly ash in concrete to be less than 5%. The LOI is a measure of the carbon content of the fly ash. For consistency in quality concrete, many state highway departments require an LOI of less than 3%.

The fly ash typically produced by coal burning facilities, such as power plants, is not controlled as to its carbon content, and may have an LOI as high as 10%. Such fly ash is not useable and must be disposed off in an environmentally safe manner. Because of the value of fly ash as a concrete additive and because of the need to dispose of vast quantities of fly ash produced each day, there have been a number of attempts at lowering the carbon content of fly ash. To date, none of these processes has produced a fly ash that is consistently low in carbon content.

One prior process uses microwave energy to heat the carbon in fly ash to combustion. An example of such a device is described in U.S. Pat. No. 4,549,053 issued to G. Haugh. The difficulty with the Haugh device is that it is not possible to uniformly control the temperature of the carbon particles. Some of the carbon is heated sufficiently to burn and other particles are not. It is better to provide a combustion chamber to heat all of the fly ash.

Heating fly ash in a combustion chamber has been tried by introducing flammable gases into the combustion chamber. The difficulty with this technique is that it is expensive and produces undesirable gas side products that must then be scrubbed from the fly ash and gas mixture after the burn.

A prototype device for electrically heating fly ash to the combustion point was created by the present inventor, and described in a publication in *Aberdeen's Concrete Trader* in August, 1991, entitled "Thermal Processor Burns OFF Carbon To Reduce Fly Ash Variability," written by B. A. Suprenant. A similar article was republished at pages 114–118 of the February, 1992, issue of *Aberdeen's Concrete Construction*. In this prototype device, the fly ash is dragged through an electrically heated pre-heat chamber and then through a combustion chamber. While the prototype device was superior to the gas fired chamber and to microwave devices for burning fly ash, it still did not achieve a consistent burn of the carbon in the fly ash.

SUMMARY OF THE INVENTION

It is an object of this invention to thermally process fly ash in a manner to produce a constant LOI fly ash.

It is a further object of this invention to control the thermal processing of fly ash so as to control the LOI of the processed fly ash.

In accordance with this invention, the above objects are accomplished by tumble mixing the fly ash in heated, closed chambers producing maximum combustion of carbon in the fly ash. Further, the tumble mixing is done while injecting air and oxygen into the tumbling heated fly ash. The pre-heat chamber brings the fly ash to a temperature of at least 700° F. The pre-heat chamber is followed by a combustion chamber that is heated to temperatures between 1000° and 2200° F. and preferably between 1300° and 1500° F.

The tumble mixing is accomplished by feed screws. Each flight of the screw contains a folded cut in a portion of the screw blade. As a result, for each foot of ash moved forward, approximately $\frac{1}{3}$ to $\frac{1}{2}$ foot of ash is moved back. This results in a tumbling motion thoroughly mixing the ash in the pre-heat and combustion chambers.

In addition, the screw shafts are hollow with air orifices every few inches. As a result, an oxygenated air mixture may be injected into the tumbling fly ash to aid the combustion of the carbon in the fly ash. To further aid combustion, fans are provided in the walls of the combustion chamber to blow air into the combustion chamber.

The oxygenated air injected may be adjusted to obtain the proper combustion to get the desired LOI value for the fly ash. The forced air from the side walls of the combustion chamber may also be adjusted to get the proper burn of carbon in the fly ash. Finally, the speed of the screws may be adjusted to control the time of the flow through the thermal processor to get the desired LOI value of output fly ash. Spectrometers monitoring the color of the output of the fly ash may be calibrated to adjust one or more of the above variables.

After the combustion chamber, the burned fly ash is cooled by being passed through water-jacket pipes. The pipes contain screw feeds to carry the fly ash through the pipes. In addition, the screws may be hollow through which water can be forced to aid the cooling of the fly ash.

The great advantage of this invention is that the fly ash produced by the thermal processor has a constant controllable LOI value. In addition, the processor is a closed system that produces low LOI fly ash and $CO_2$. The processor converts useless fly ash to valuable fly ash, and does it in a pollution free process.

Other objects, advantages and features of the invention will be understood by those of ordinary skill in the art after referring to the complete written description of the preferred embodiments in conjunction with the following drawings.

DESCRIPTION OF THE PREFERRED EMBODIMENTS

Figure 1:
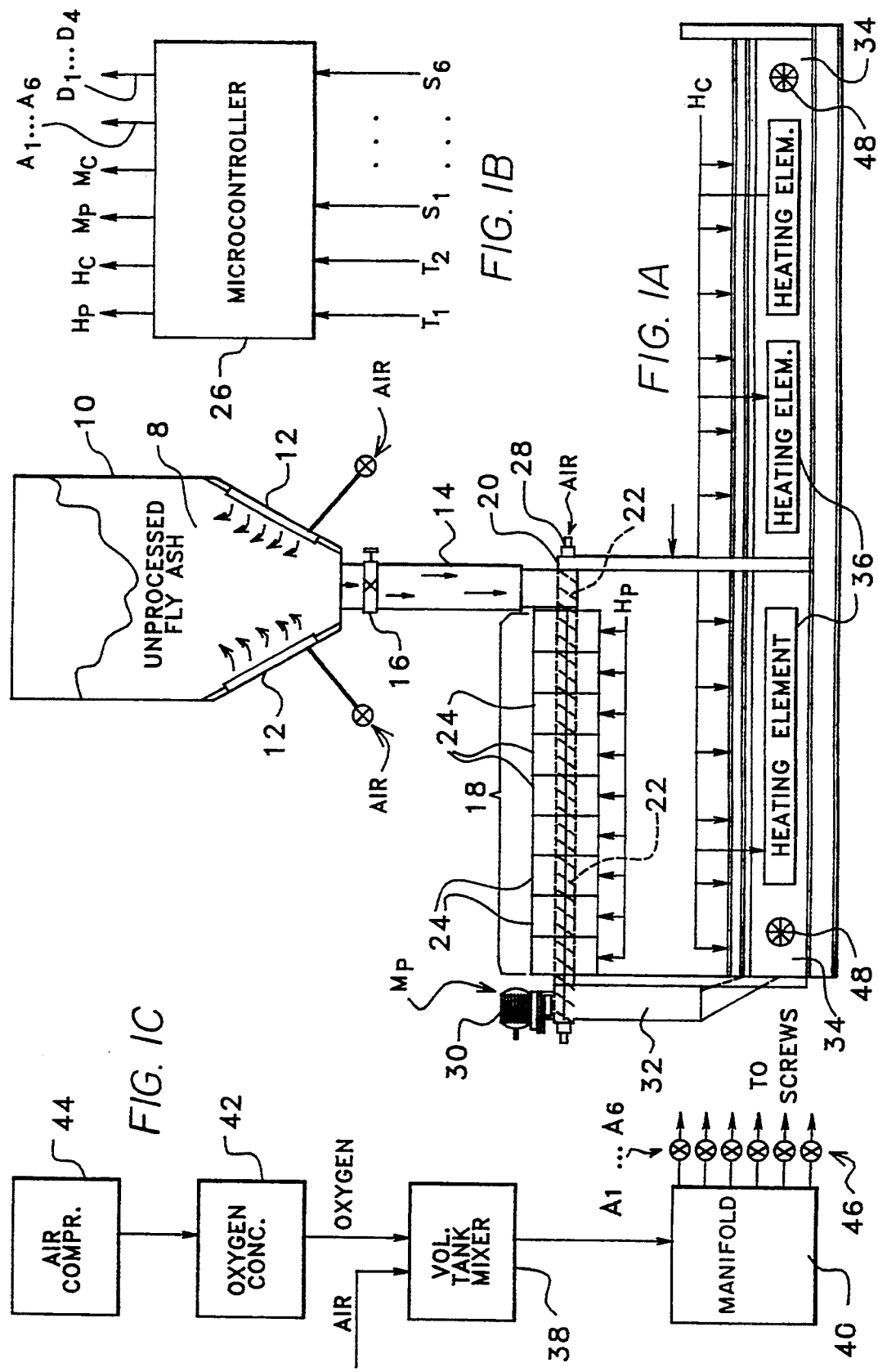
FIG. 1 consists of FIGS. 1A, 1B and 1C and is an overview of the fly ash processing system.

The preferred embodiment of the fly ash processor is shown in FIG. 1. Unprocessed fly ash 8 is stored in a supply hopper 10. The supply hopper is shown cutaway. At the conical base of the hopper, there are aeration strips 12. These strips are hollow chambers with holes on the inside surface of the hopper. When air is forced into the strips, the fly ash is aerated. The air flow through each strip is 1–5 CFM (Cubic Feet per Minute). There may be any number of strips distributed around the conical base. The preferred embodiment uses four such strips, and a flow rate of 3 CFM per aeration strip.

The purpose of the aeration in the supply hopper 10 is to begin the oxygenation of the fly ash, and to keep the fly ash in a flowable condition. Without aeration, the fly ash will tend to compact in the hopper. With aeration, the fly ash easily flows out the discharge tube 14 at the base of hopper 10. The volume of the fly ash flow can be adjusted by valve 16.

From discharge tube 14, the fly ash enters the preheat chamber 18. Pre-heat chamber 18 is a stainless steel tube 20 with an interior screw feed 22. The tube is surrounded by cylindrical electric heating elements 24 along the entire length of chamber 18. The heating elements are adjustable in heat output by means of control signal $H_p$. The purpose of the pre-heat chamber is to raise the temperature of the fly ash to between 500°–1000° F. In the preferred embodiment, the pre-heat temperature is set to 700° F. A temperature sensor may be placed in the fly ash flow near the end of the pre-heat chamber 18, and be sensed as temperature $T_1$. An operator may observe $T_1$ and adjust the control signal $H_P$ to heating elements 24, or microcontroller 26 may be programmed for this purpose.

Microcontroller 26 would include a microcontroller chip, such as the INTEL 8051 chip, and adapters, drivers and additional memory if necessary. The adapters process the sensed signals and apply them to input ports on the 8051 chip. The drivers convert the output control signals from the output ports of the chip to the electromechanical control signals to adjust valves, heating elements, and motors.

Air is also injected into the ash as it flows through the pre-heat chamber 18. This is accomplished by using a hollow shaft for the screw feed and placing holes at regular intervals along the shaft. Pressurized air is introduced through a nipple 28 at the end of the shaft. The air injection shaft is also used in the combustion chamber, and will be described in more detail in the description of the combustion chamber apparatus.

Motor 30 drives the feed screw 22 to deliver a predetermined volume of pre-heated fly ash to discharge chute 32. The speed of the motor is controlled by the $M_P$ signal applied to the motor. The flow rate through the processor is controlled by the motor speed.

The fly ash falls down the discharge chute and enters the combustion chamber 34. The combustion chamber is heated to 1000°–2200° F. by electric heating elements 36 placed in the side walls at the top and the base of the combustion chamber 34. In the preferred embodiment, the combustion chamber is constructed of high temperature stainless steel, and the operating temperature is set at 1300°–1500° F. Higher temperatures may be used, but different structural materials for the chamber would be necessary. Titanium or ceramic materials might be used in a very high temperature implementation of the invention.

The temperature $T_2$ of the combustion chamber 34 may be sensed by placing a temperature sensor in the chamber, or in the fly ash flow near the end of the chamber. The control of the heating elements 36 is from a signal $H_C$ applied to the heating elements. An operator may observe the temperature of the combustion chamber and adjust the heat, via signal $H_C$, or microcontroller 26 could be programmed to perform that task.

Fly ash is moved through chamber 34 by six parallel feed screws. These screws are shown in more detail in FIGS. 2–4. The feed screws not only feed the ash through the chamber, but they also tumble and mix the ash as the ash moves. In addition, the feed screws inject a blend of air and oxygen into the fly ash. The tumble mixing and the injection of oxygenated air into the fly ash greatly facilitates the burning of the carbon particles in the fly ash.

Air/oxygen blend is injected through the hollow shafts of the feed screws. The blend is supplied from a volume tank mixer 38 through a distribution manifold 40. Oxygen is produced by oxygen concentrator 42 which receives pressurized air from air compressor 44. Oxygen is introduced into mixer 38 at the rate of 1.4 CFM for every 3 CFM of air/oxygen blend flowing from mixer 38 to manifold 40. Individual flow rates into each of the six hollow shafts are controlled by valves 46. Control signals $A_1, A_2, \ldots A_6$ control an associated valve 46 to control the flow of air/oxygen into each shaft. The valves may be operator controlled, or controlled by microcontroller 26. Flow rate of ash through the combustion chamber 34 would be controlled by controlling the speed of the feed screws. The feed screws may be driven by motor 30 or may be driven by a separate motor. If driven by a separate motor, that motor must be controlled by a signal $M_C$ to control the speed of ash flow through the combustion chamber. Control signal $M_C$ may be operator controlled, or controlled by programmed microcontroller 26.

Damper fans 48, preferably two on each long side of the combustion chamber 34, are provided to control the gross level of air in the combustion chamber. Each of these blowers would be controlled by an associated damper signal $D_1, \ldots D_4$ from microcontroller 26 or as set by an operator.

Microcontroller 26, in addition to receiving temperatures $T_1$ and $T_2$ of the pre-heat chamber 18 and combustion chamber 34, could also feed back signals from the flow of the injected air/oxygen blend, the flow of the ash and the color of the processed ash as it exits the combustion chamber. Spectrometers (not shown) may be mounted at the discharge end of each feed screw in the combustion chamber. The color of the ash, once the spectrometers are calibrated, gives an accurate measure of the LOI value for the ash. Accordingly, color information sensed by the spectrometers could be used by the microcontroller to make the adjustments in flow rates or temperatures. Alternatively, an operator may observe the colors and adjust the air/oxygen flow, or the ash flow rate or the temperature. In the preferred embodiment, the air and air/oxygen flows and temperatures are adjusted for maximum combustion, and the ash flow is adjusted to achieve the desired level of LOI value.

Figure 2:
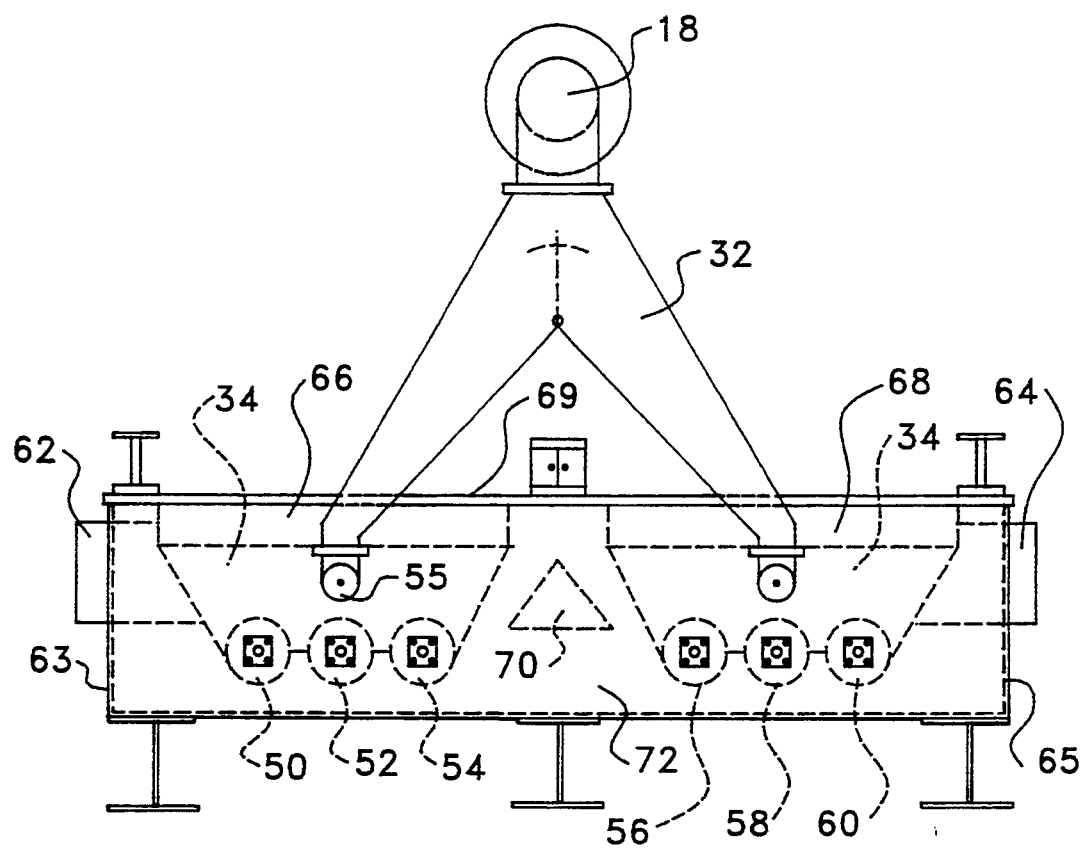
FIG. 2 is an end view of the entry end for the combustion chamber of the fly ash processor.

In FIG. 2, there is an end view of the entry end of the combustion chamber. Chute 32 feeds pre-heated ash from the end of pre-heat chamber 18. Chute 32 is split to deliver half of the ash to feed screws 50, 52 and 54, and the other half to feed screws 56, 58 and 60. A feeder screw 55 feeds the fly ash from the left half of chute 32 to screws 50, 52 and 54. A feeder screw 59 feeds the fly ash from the right half of chute 32 to feed screws 56, 58 and 60.

Combustion chambers 34 are surrounded by heating elements. There are heating elements 62 and 64 in the side walls 63 and 65, heating elements 66 and 68 mounted to the top 69 and heating element 70 in the center of the base hearth material 72. The hearth material is Narcohearth #23 material. This material can be further strengthened by adding 10% processed fly ash to the material when it is poured.

In the preferred embodiment, the heating elements are electric and closed off from the chamber. Dust should not move from the combustion chamber to a heating element. Alternatively, gas-fired, oil-fired or even coal-fired heating elements could be used if isolated in their own heating chamber with little or no gas flow with the combustion chamber. Also, it is undesirable in a non-electric heating embodiment for the gases to flow from the heating element into the fly ash combustion chamber.

Figure 3:
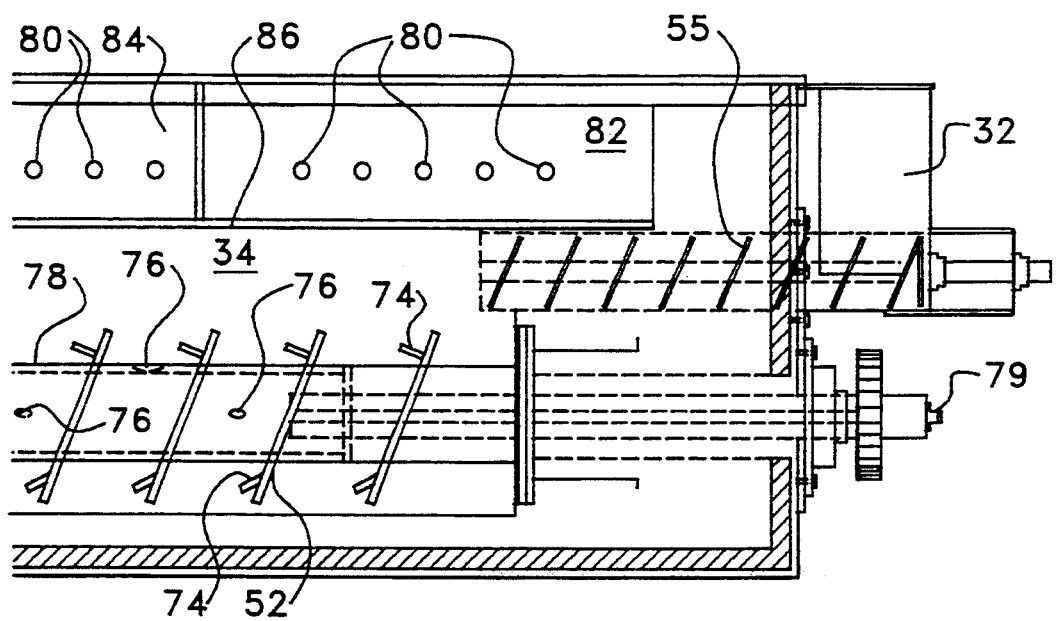
FIG. 3 is a cutaway side view of the entry end of the combustion chamber.

FIG. 3 shows a side cutaway view of combustion chamber 34 at the entry end; fly ash would move from right to left. Fly ash enters down chute 32, and is moved left to chamber 34 by feeder screw 55. At the left end of screw 55, the ash falls onto feed screws 50, 52 and 54 (screw 52 is shown in FIG. 3). The screw blades are partially cut and folded forward. In the preferred embodiment, the screw blades are 12" in diameter on a 4" in diameter shaft. During each flight (one revolution of screw) there are two 4" long and 2" deep cuts in the circumference of the screw. This cut is folded forwarded at approximately 60°. The result of this partial fold 74 in screw blade is that for each cubic foot of ash moved forward, approximately 0.5 cubic feet of ash move backward along the screw. This creates a tumble-and-mix operation in the fly ash as it moves through the combustion chamber 34.

To further aid combustion of the coal particles, the air/oxygen blend is injected into the fly ash mix from holes 76 in the hollow shaft 78 of the screw. The air/oxygen blend is forced into the hollow shaft through nipple 79 at the end of the shaft. The holes 76 in the shaft are spaced approximately one per flight of screw. Also, the angular position of each hole around the circumference of the shaft changes about 90° between each hole.

In the preferred embodiment, the holes are about 1/16" diameter and about 0.5 CFM of air/oxygen blend is flowing through each hole. It will be appreciated by one skilled in the art that other diameters and flow rates might be used without departing from the spirit of the invention. The purpose of the holes and the air/oxygen injection is to facilitate the burning of carbon particles in the fly ash as the folded screw tumbles and mixes the fly ash and oxygen. The carbon particles burn to form $CO_2$, and a very low LOI value fly ash is the result. Also, and almost more important, the LOI value of the fly ash is controllable so that a fly ash having a constant and low LOI value is produced.

Also shown in FIG. 3 are electric heating rods 80 in top heating elements, or chambers, 82 and 84. At the base of the heating chambers 82 and 84, there is a dust plate 86. The dust plate prevents dust from the fly ash from reaching the heating elements.

Figure 4:
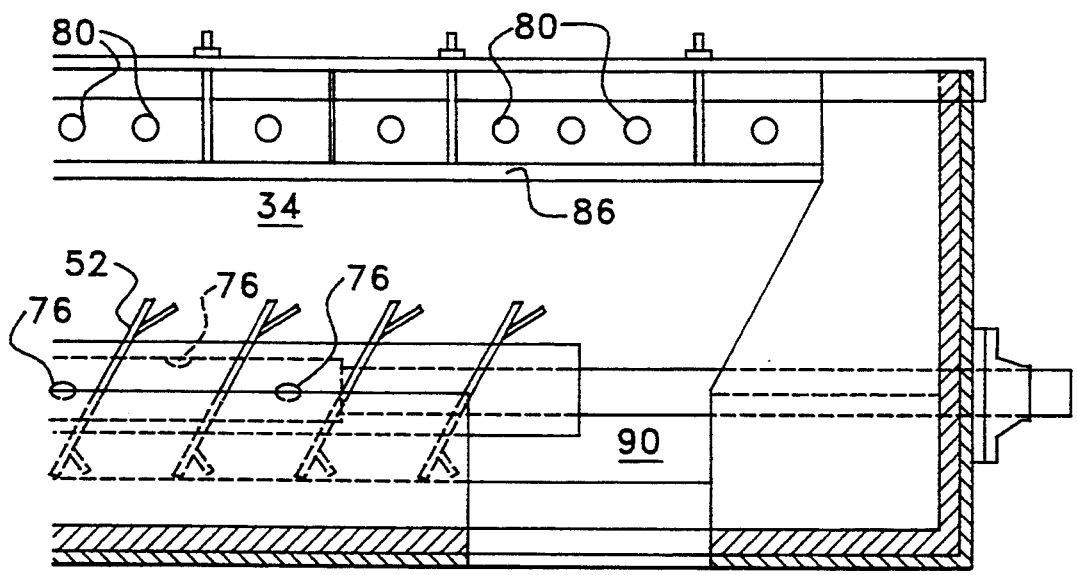
FIG. 4 is a cutaway side view of the discharge end of the combustion chamber.

The discharge end of the combustion chamber 34 is shown cutaway and from the side in FIG. 4. Fly ash moves from left to right in FIG. 4. Screw 52 contains holes 76, just as in FIG. 3, for injecting the air/oxygen blend into the tumbling fly ash. Folds 74 in the screw blade provide the tumble mix of the fly ash as described for FIG. 3. Electric heating rods 80 and dust plate 86 are also shown in FIG. 4. Rods 88 (not shown in FIG. 3) fasten the dust plate 86 to the top plate of the housing for the combustion chamber 34.

When the fly ash reaches the end of the combustion chamber 34, it falls out chute 90. There is a chute 90 under each of the six feed screws in the combustion chamber. The chute directs the processed fly ash into a cooling apparatus.

Figure 5:
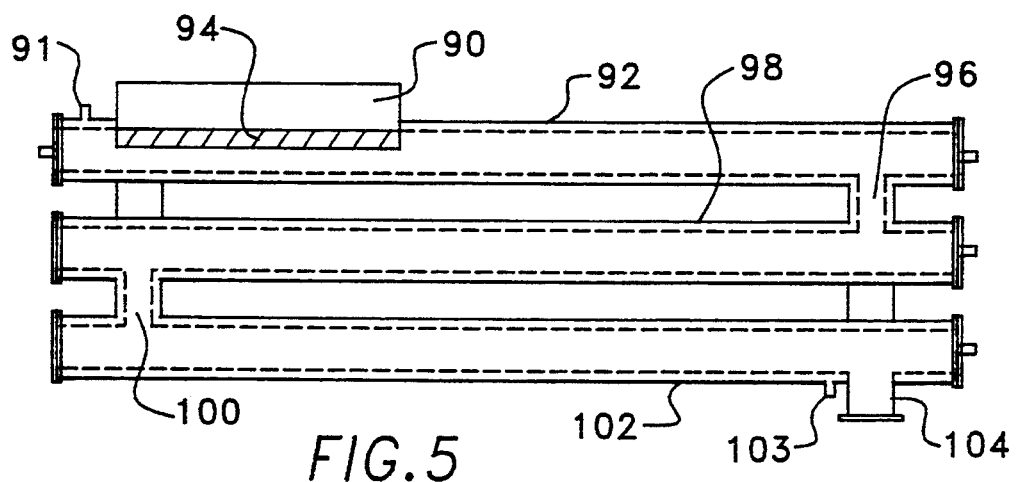
FIG. 5 shows the cooling apparatus for the fly ash after it leaves the combustion chamber.
Figure 6:
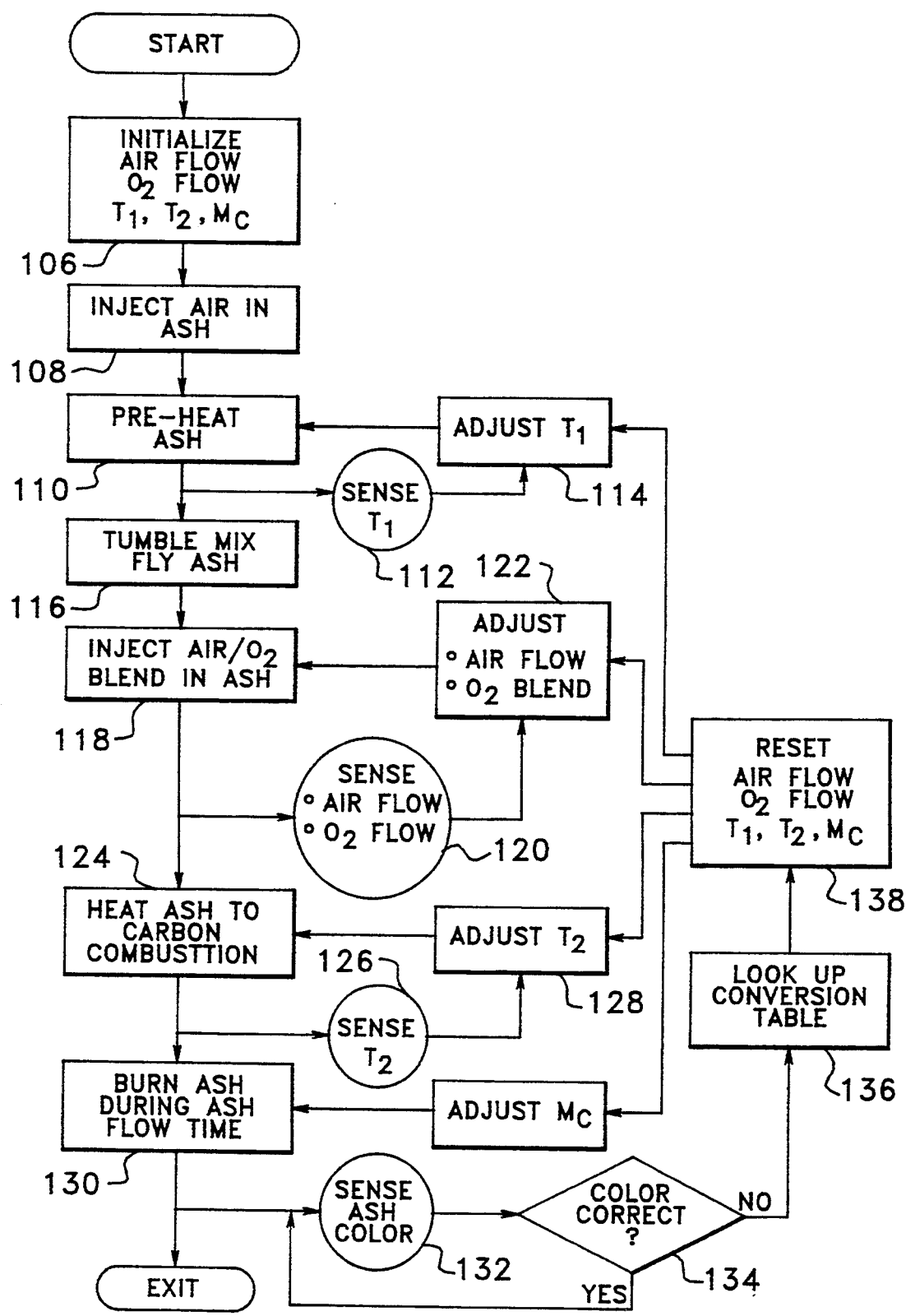
FIG. 6 shows the process flow for the thermal ash processor.

FIG. 5 shows the cooling apparatus which consists of a set of three water jacketed tubes stacked on top of each other. Water flows into the tubes at inlet 91, and exits the tubes at outlet 103. The cooling apparatus should reduce the temperature of the fly ash from approximately 1500° F. to 200° F. A feed screw in each tube moves the fly ash through each tube. Each feed screw is preferably hollow and water cooled from the inside. In FIG. 5, fly ash falls through chute 90 and enters top tube 92. The ash is carried by screw 94 (blades shown at base of chute 90) until the ash falls through chute 96 to tube 98. A feed screw carries the ash through tube 98 to chute 100 to tube 102 where a screw carries the ash to exit chute 104. The ash would them be conveyed to a collection hopper for processed fly ash. In FIG. 6, the process flow and process control is illustrated. The process starts at operation 106 where the control variables for the processing apparatus are initialized. Air flow for the aeration supply hopper, the pre-heat chamber, the combustion chamber (injection and dampers) is set to initial values that are expected for the fly ash being processed. The values would be determined from experimentally determined values in a conversion table for various types of fly ash. Similarly, the $O_2$ for the oxygen flow at mixer 38 is set to an initial value, as are the pre-heat temperature $T_1$, the combustion chamber $T_2$, and the speed $M_C$ of the motor that controls the flow rate through the combustion chamber.

Operation 108 injects air into the fly ash. In the preferred embodiment, operation 108 is taking place both in the aeration supply tank 10 and the pre-heat chamber 18. Operation 110 then pre-heats the ash to approximately 700° in the pre-heat chamber 18. The temperature of the pre-heat chamber is sensed in operation 112, and adjusted in operation 114 so that the temperature is held near the desired $T_1$ value.

In operation 116, the folded-blade feed screw tumble mixes the fly ash in the combustion chamber as the fly ash moves through the chamber. Simultaneously with the tumble mixing operation, the air/oxygen blend is injected by operation 118 into the fly ash through the feed screw shaft, as described earlier. The flow rate of air and oxygen at the mixer 38 is sensed by sensing operation 120, and adjusted by operation 120 to hold the flow rates near the initial values. In addition, the flow rates of air injected in each of the six feed screw shafts could be initialized, sensed and maintained at initial values by adjusting the variables $A_1, A_2, \ldots A_6$.

In operation 124, the heating elements at the combustion chamber heat the fly ash to a temperature $T_2$ preferably in the range from 1300°–1400° F. This temperature is sensed by sensing operation 126, and used as feedback to operation 128 that adjusts $T_2$ by adjusting the signal $H_C$ to the heating elements to hold $T_2$ near its initial value.

Operation 130 controls the burn time of the fly ash by controlling the speed of the motor that drives the six feed screws in the combustion chamber 34. Nominal or initial value would be set to approximately 20 minutes.

The adjustment of the control variables from initial values is based on the color of the ash. The color of the ash is directly related to the LOI value and, thus, the carbon content. Knowing the type of fly ash being processed, the color of processed fly ash at different LOI values is also known. Sensing operation 132 uses spectrometers to sense the color of the ash. If decision 134 detects that the color is correct, operation 132 continues to monitor the color of the ash. If the color is not correct, the control process branches from decision 134 to operation 136.

In operation 136, new values for the variables are determined from a conversion table. Based on the type of fly ash and the color of processed fly ash, a new set of variables is passed to operation 138. Operation 138 then resets the air flow rates, the oxygen flow rates, the temperatures $T_1$ and $T_2$, and the feed screw motor speed $M_C$. These feedback operations may be accomplished by an operator, a microcontroller (FIG. 1), or a combination of operator with a microcontroller.

While a number of preferred embodiments of the invention have been shown and described, it will be appreciated by one skilled in the art, that a number of further variations or modifications may be made without departing from the spirit and scope of my invention.

What is claimed is:

1. Thermal processing apparatus for reducing the carbon content of fly ash, said apparatus comprising:
   a combustion chamber for the fly ash;
   means for heating the fly ash in said combustion chamber to an optimum combustion temperature for the carbon particles in the fly ash, said heating means being adjacent to but separated from the combustion chamber;
   means for tumble mixing the fly ash and feeding the fly ash through said combustion chamber; and
   means for injecting air into the fly ash in the combustion chamber as the fly ash is tumble mixed by said mixing means and thereby facilitate the burning of the carbon particles.

2. The apparatus of claim 1 and in addition:
   a pre-heat chamber for the fly ash;
   means for feeding the fly ash through the pre-heat chamber to the combustion chamber; and
   means for injecting air into the fly ash in the pre-heat chamber.

3. The apparatus of claim 2 and in addition:
   means for cooling the fly ash after the fly ash leaves the combustion chamber.

4. The apparatus of claim 3 wherein said cooling means comprises:
   water cooled tubes;
   means for feeding the processed fly ash through the water cooled tubes; and
   means for cooling said cooling tube ash feeding means.

5. The apparatus of claim 1 wherein said injecting means comprises:
   a supply of oxygen;
   means for blending air with oxygen from said oxygen supply; and
   means responsive to said blending means for injecting the air/oxygen blend into the fly ash.

6. The apparatus of claim 5 and in addition:
   means for sensing the temperature of said combustion chamber; and
   means responsive to said sensing means for controlling said heating means to maintain the temperature at the optimum carbon combustion temperature.

7. The apparatus of claim 5 and in addition:
   means for sensing the flow rate of air and the flow rate of oxygen provided by said injecting means; and
   means for controlling said injecting means to adjust the air/oxygen blend injected into the fly ash.

8. The apparatus of claim 5 wherein said mixing means comprises:
   feed screw means for feeding forward a portion of the fly ash while feeding backward a smaller portion of the fly ash whereby as the fly ash is fed through the combustion chamber, the fly ash is tumbled by said feed screw means.

9. The apparatus of claim 8 and in addition:
   means for sensing the temperature of said combustion chamber;
   means responsive to said sensing means for controlling said heating means to maintain the temperature at the optimum carbon combustion temperature;
   means for sensing the flow rate of air and the flow rate of oxygen provided by said injecting means;
   means for controlling said injecting means to adjust the air/oxygen blend injected into the fly ash;
   means for sensing the LOI value of the fly ash as the fly ash exits the combustion chamber;
   means for detecting whether the LOI value is correct; and
   means for adjusting said heat controlling means and said injection controlling means and said feed screw means to change the combustion and burn time and thereby the LOI value of fly ash as it exits the combustion chamber.

10. Thermal processing apparatus for reducing the carbon content of fly ash, said apparatus comprising:
    a pre-heat chamber for the fly ash;
    a combustion chamber for the fly ash;
    means for feeding the fly ash through the pre-heat chamber to the combustion chamber;
    means for pre-heating the ash in the pre-heat chamber to a temperature of approximately 700° F.;
    means for injecting air into the fly ash in the pre-heat chamber;
    means for heating the fly ash in said combustion chamber to an optimum combustion temperature in the range of 1300°–1500° F., said heating means being adjacent to but separated from the combustion chamber;
    feed screw means for feeding forward a portion of the fly ash while feeding backward $\frac{1}{8}$ to $\frac{1}{2}$ of the fly ash portion fed forward whereby as the fly ash is fed through the combustion chamber the fly ash is tumbled by said feed screw means;
    a supply of oxygen;
    means for blending approximately 3 parts air with approximately 1.4 parts oxygen from said oxygen supply to produce an air/oxygen blend; and
    means for injecting the air/oxygen blend into the fly ash in the combustion chamber as the fly ash is tumble mixed by said mixing means and thereby producing thermally processed fly ash with a consistent and low carbon content.

11. The apparatus of claim 10 and in addition:
water cooled tubes;
means for feeding the processed fly ash from the combustion chamber through the water cooled tubes;
means for water cooling said cooling-tube ash feeding means; and
said processed fly ash exits the cooling tubes at a temperature below 200° F.

* * * * *